(12) United States Patent
Adams et al.

(10) Patent No.: US 7,140,862 B2
(45) Date of Patent: *Nov. 28, 2006

(54) REMOVABLE IN-MOLD DEGATING INSERT

(75) Inventors: Robert J. Adams, Ypsilanti, MI (US); Joseph J. Davis, Jr., Ortonville, MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/311,080

(22) Filed: Dec. 19, 2005

(65) Prior Publication Data

US 2006/0093701 A1    May 4, 2006

Related U.S. Application Data

(62) Division of application No. 10/394,318, filed on Mar. 21, 2003, now Pat. No. 7,021,923.

(51) Int. Cl.
B29C 45/26    (2006.01)

(52) U.S. Cl. .................. 425/190; 425/183; 425/567

(58) Field of Classification Search .............. 425/183, 425/190, 567
See application file for complete search history.

(56) References Cited

U.S. PATENT DOCUMENTS

| | | | |
|---|---|---|---|
| 3,371,385 A | 3/1968 | Cordio et al. | 18/30 |
| 3,737,271 A | 6/1973 | Novak | 425/247 |
| 4,465,651 A | 8/1984 | Godschalk, Jr. et al. | 264/161 |
| 4,647,275 A | 3/1987 | Lundquist | 425/553 |
| 5,028,227 A | 7/1991 | Gellert et al. | 425/190 |
| 5,405,255 A | 4/1995 | Neu | 425/116 |
| 5,435,956 A | 7/1995 | McCrory | 264/161 |
| 5,662,946 A | 9/1997 | Pratt et al. | 425/190 |
| 5,886,398 A | 3/1999 | Low et al. | 257/667 |
| 6,113,828 A | 9/2000 | Feick | 264/161 |
| 6,158,205 A | 12/2000 | Schnipke et al. | 59/71 |
| 6,235,230 B1 | 5/2001 | Puniello | 264/278 |
| 6,481,996 B1 | 11/2002 | Graham | 425/168 |

FOREIGN PATENT DOCUMENTS

| | | |
|---|---|---|
| GB | 698721 | 10/1953 |
| JP | 6143352 A | 5/1994 |
| JP | 09070861 A | 3/1997 |
| JP | 2001300992 A | 10/2001 |
| WO | WO 01/123156 A1 | 4/2001 |

*Primary Examiner*—Joseph S. Del Sole
*Assistant Examiner*—Emmanuel S. Luk
(74) *Attorney, Agent, or Firm*—Bill Panagos

(57) ABSTRACT

An in-mold degating device that includes a base having mounting ears for removable attachment to a mold system. The base is removably attached to the die half such that the uppermost surface of the base is flush with the surface of the die half. The insert further includes a body fixed to the base including a pair of opposed surfaces that define predetermined relief angles relative to the base. The body further includes a gate flow passage having an inlet within one of the opposed surfaces and an outlet within the other of the opposed surfaces. The gate flow passage tapers inwardly from the inlet to the outlet. The outlet includes an edge surface that forms an acute angle relative to the gate flow passage. The edge surface defines a shearing edge point that separates the finished molded part from cooled excess material.

5 Claims, 3 Drawing Sheets

REMOVABLE IN-MOLD DEGATING INSERT

CROSS-REFERENCE TO RELATED APPLICATION(S)

The present application is a divisional of U.S. patent application Ser. No. 10/394,318, filed Mar. 21, 2003 now U.S. Pat. No. 7,021,923, dated Apr. 4, 2006.

BACKGROUND OF THE INVENTION

1. Field of the Invention

The present invention relates, generally, to a degating device for use in connection with an injection molding system used in the manufacture of molded articles and, more specifically, to a removable, in-mold, degating device for severing the molded article from flash material.

2. Description of the Related Art

Plastic injection molding is a conventionally known manufacturing process. The process typically involves the transfer of molten thermoplastic material from an injection cylinder through a runner system, including a sprue, a gate, and ultimately into a mold cavity formed by a die. The die is typically separated into halves. One or both of the halves may include at least one opening to permit conveyance of the molten thermoplastic material into the mold cavity. The mold cavity corresponds to the shape of the article to be molded. The point at which the runner system communicates with the opening to the mold cavity is commonly referred to as a gate. A gate is typically either a fixed member that is integrated into the mold assembly or attached to the end of the molten thermoplastic injection machine. Gates generally have a tapered internal conduit through which the molten thermoplastic material enters the mold cavity at a rate determined by the size of the gate outlet.

After the thermoplastic material fills the mold cavity and solidifies, the article may be removed from the mold cavity. However, the injection molding process produces excess thermoplastic material that solidifies within the gate and a portion of the runner system that remains attached to the molded article. This excess material is commonly known in the art as "flash." The act of removing flash is known as degating.

Current technology within the field includes the use of degating machines that shear off the flash after the article is removed from the mold or involve removing the molded article in a manner perpendicular to that of the gate to effectively utilize an edge of the gate to remove the flash from the molded article. Incorporation of a degating machine into the injection molding manufacturing process is a costly venture. In some cases, the incremental cost associated with degating machines often prohibits their use in order to maintain a competitive price for the manufactured article.

In response to this problem, gating devices were developed in the related art that include edges used to degate the molded article. The following United States patents disclose the use of the edge of a gate as a degating device.

U.S. Pat. No. 3,371,385, issued to A. Cordio et al., discloses an injection mold assembly with a shearing means in connection with creating soles for shoes. The Cordio et al. device utilizes a small cylindrical gate to inject molten material into a shoe sole mold and the edge of the gate to sever the flash upon removal of the shoe sole from the mold. However, the severed flash that remains within the gate and runner within the mold must be removed after each molding event.

U.S. Pat. No. 3,737,271, issued to George J. Novak, discloses an apparatus having a gate with a sharpened, knife-like edge for severing excess material from the molded product. However, the degating device disclosed by Novak forms a permanent part of the die that defines the mold.

While gating devices that employ a degating edge are known to alleviate some of the problems associated with removing flash material from a molded article, they are generally limited for use in connection with the die in which they are integrated. In other words, the gating devices are integrally formed or associated with a particular die and therefore may not be removed or used with other dies as the need arises. Likewise, the die is limited to the particular gate and its restrictions, which includes, for example, the size of the gate outlet. Moreover, the devices disclosed in the aforementioned patents do not alleviate the problem of removing the flash from the runner system, namely from within the gate and runner within the mold.

Accordingly, while the gating devices having degating edges of the type known in the related art and the molding assemblies incorporating these devices have generally worked for their intended purposes, there exists a need in the art for a simple, cost effective gating device that incorporates a degating edge that is removably mounted to the molding assembly and that also facilitates ejecting the flash within the gate and runner system at the conclusion of each molding event.

SUMMARY OF THE INVENTION

The present invention overcomes the disadvantages in the related art in-mold degating devices and generally fulfills a need in the art for a removable, in-mold degating device. To this end, the removable degating insert of the present invention includes a base including mounting ears that facilitate removable attachment of the insert to a die half of a mold system. The base is removably attached to the die half such that the uppermost surface of the base is flush with the surface of the die half. The insert also includes a body fixed to the base including a pair of opposed surfaces. The opposed surfaces define predetermined relief angles relative to the base. The body further includes a gate flow passage extending therethrough having an inlet defined within one of the opposed surfaces. The inlet receives molten plastic from a runner of a mold system. The gate flow passage further includes an outlet defined within the other of the opposed surfaces to distribute molten plastic to a mold cavity of a mold system. The outlet includes an edge surface extending in a direction generally opposite that of a molded part upon ejection from a mold cavity. The gate flow passage tapers inwardly from the inlet to the outlet and the edge surface forms an acute angle relative to the gate flow passage to define a shearing edge point. The shearing edge point separates the finished molded part within a mold cavity from the cooled excess material within the gate flow passage.

Accordingly, one advantage of the present invention is that it provides a degating device that is removable from a mold.

Another advantage of the present invention is that the removable degating device may be installed and employed within several different molds.

Another advantage of the present invention is that it provides a cost-effective means of replacing the degating device without replacing the mold.

Still another advantage of the present invention is that it facilitates the use of degating devices having differing outlet diameters to provide varying molten plastic flow rates into a mold.

Yet another advantage of the present invention is that it removes flash in a cost-effective manner by reducing the need for secondary degating machines.

Other objects, features, and advantages of the present invention will be readily appreciated, as the same becomes better understood after reading the subsequent description taken in conjunction with the accompanying drawings.

DETAILED DESCRIPTION OF THE INVENTION

Figure 1:
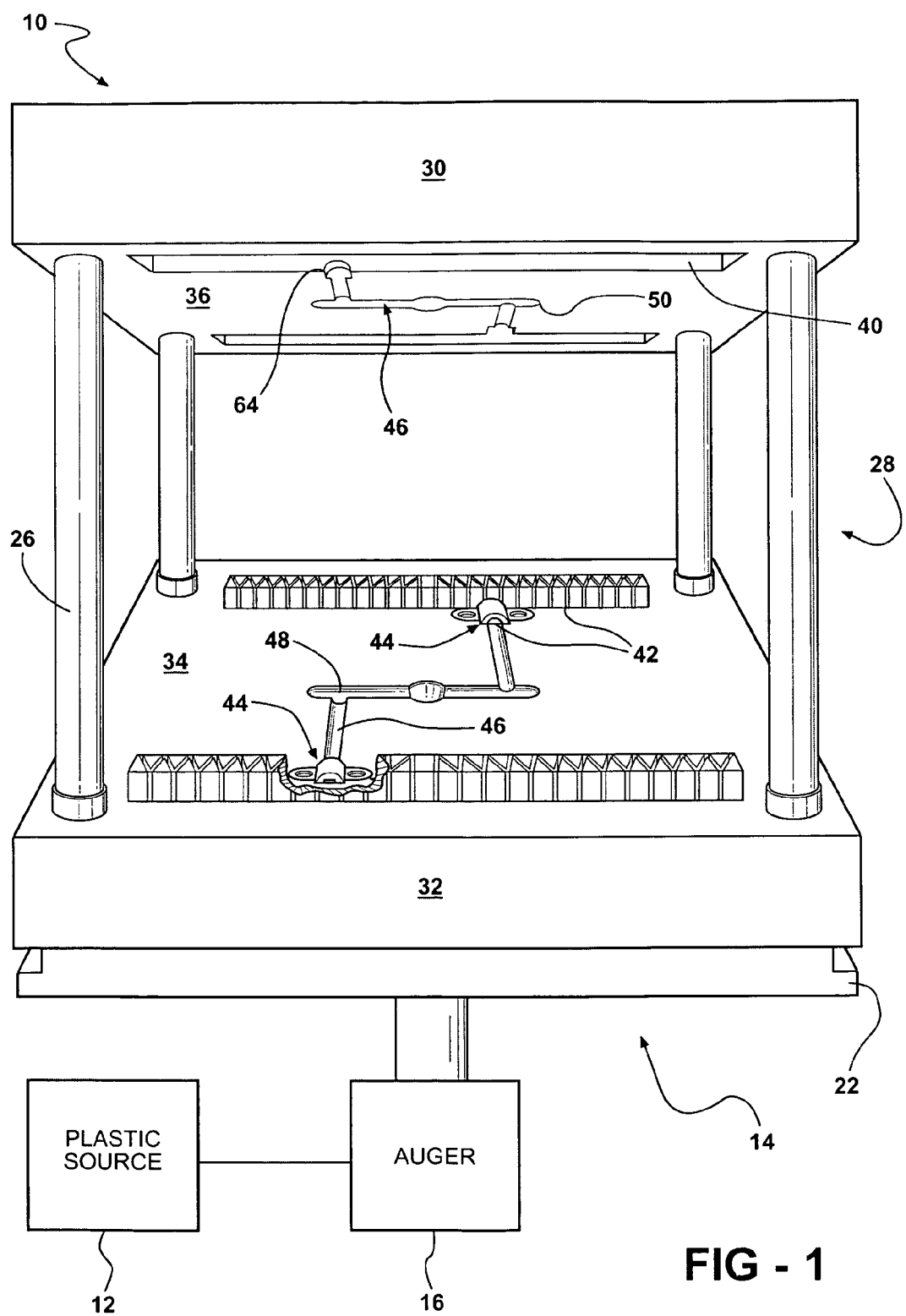
FIG. 1 is an environmental view of the injection mold system having a removable, in-mold, degating device in accordance with the present invention.
Figure 2:
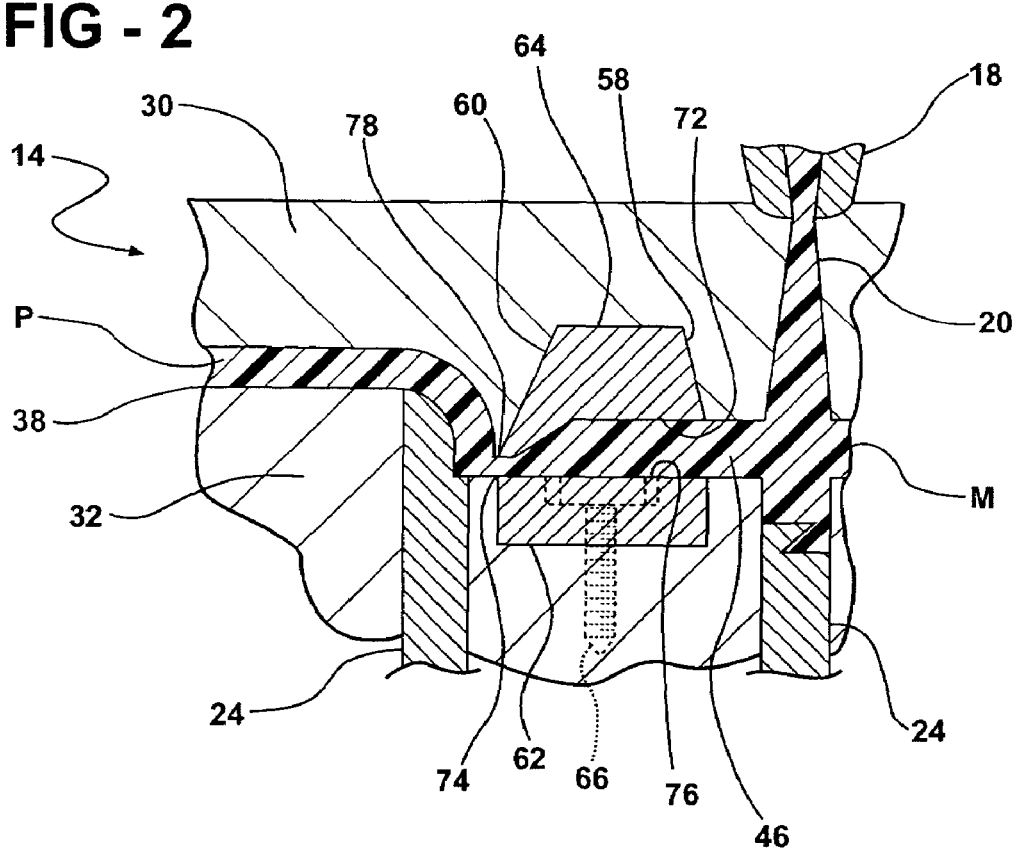
FIG. 2 is a partial cross-sectional, environmental view of the injection mold system having a removable, in-mold, degating device in accordance with the present invention.
Figure 3:
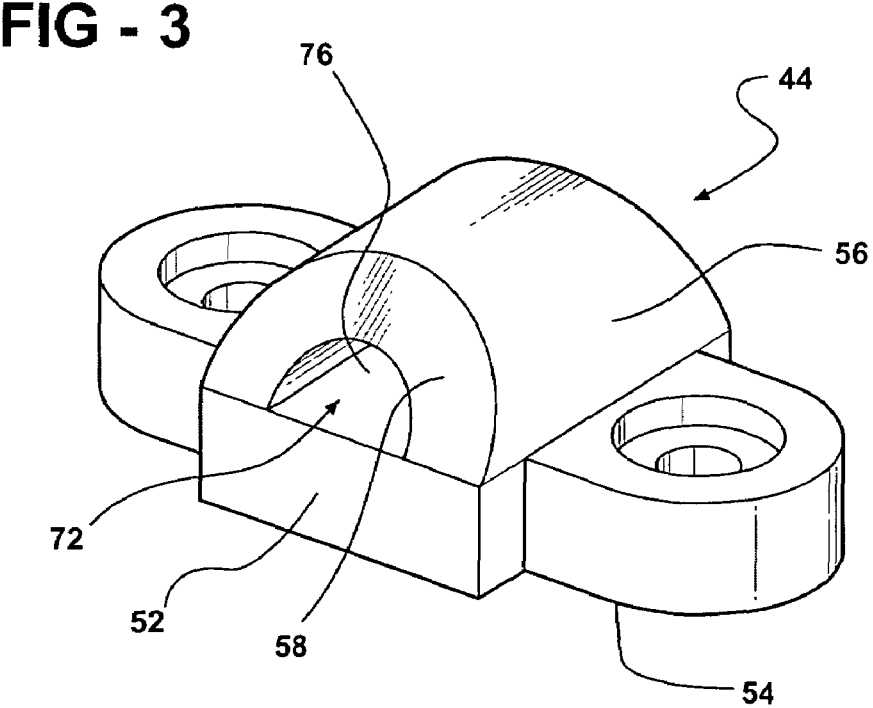
FIG. 3 is a front perspective view of the removable, in-mold, degating device in accordance with the present invention.
Figure 4:
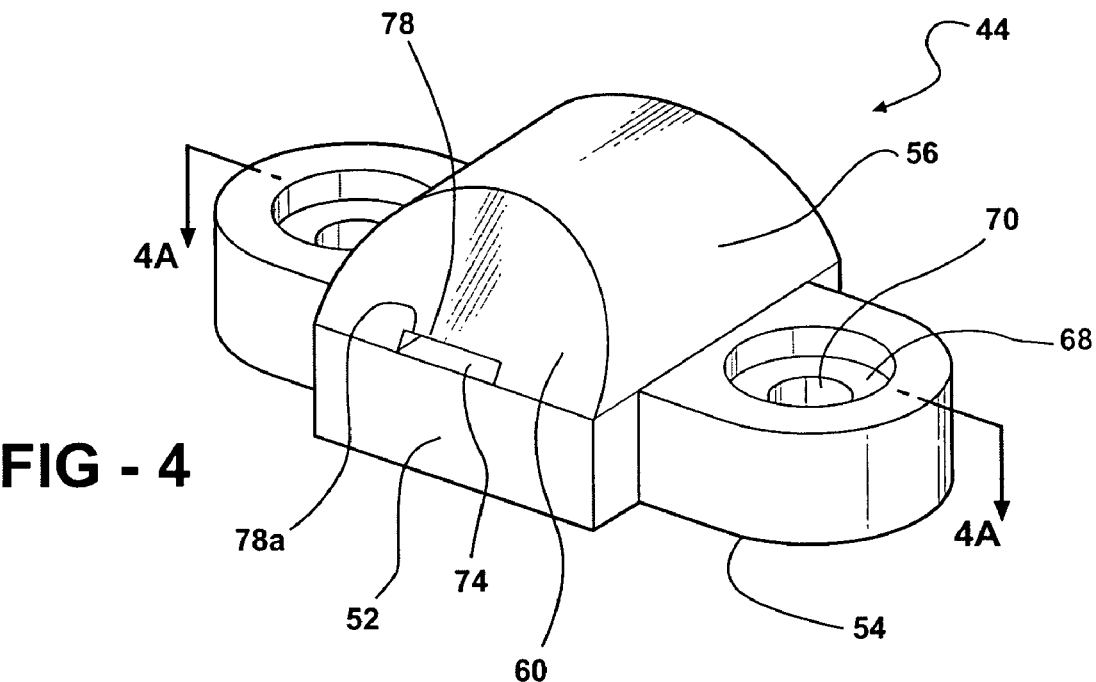
FIG. 4 is a rear perspective view of the removable, in-mold, degating device in accordance with the present invention.
Figure 4A:
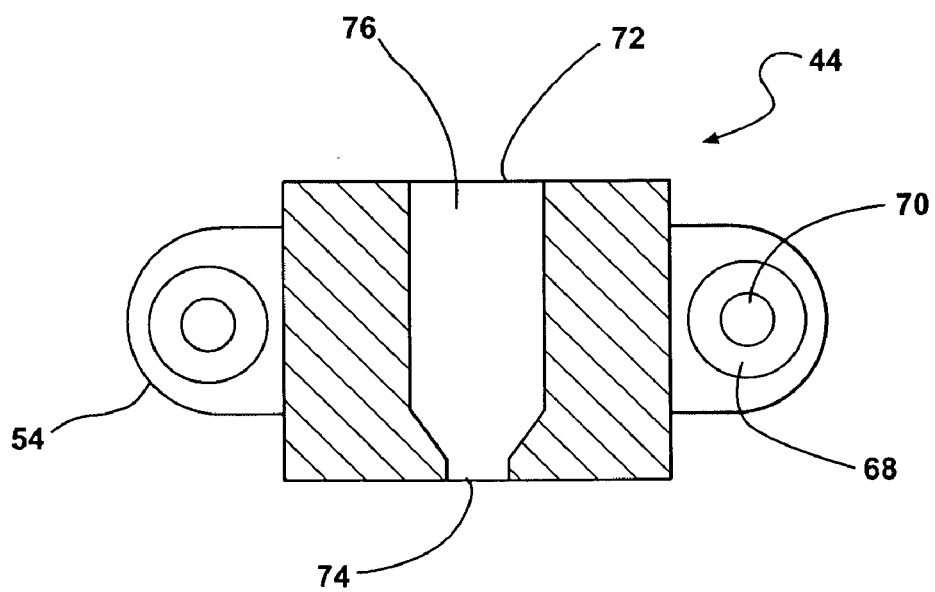
FIG. 4a is a cross-sectional view of the removable, in-mold, degating device in accordance with the present invention.

Referring now to the figures, where like numerals are used to designate like parts throughout to the drawings, there is an injection molding system of the present invention shown generally at 10 in FIG. 1. The injection molding system 10 is adapted for communication with a source of pressurized molten plastic 12 to form molded plastic parts (P) (FIG. 2). The source of molten plastic 12 operatively communicates with the injection molding system 10 through a molding tool generally indicated at 14. As shown in the illustrative embodiment of FIGS. 1 and 2 the molding tool 14 includes an auger 16 in fluid communication with an injection nozzle 18 in fluid communication with a sprue 20 for directing the pressurized molten plastic from a plastic source 12. The molding tool further includes a mold base 22 employing ejection pins 24 and support/guide rods 26. However those having ordinary skill in the art will appreciate that the present invention may be adapted to for use in several other molding applications. Accordingly a mold tool 14 need not include all of the above-identified associated components.

Referring to FIGS. 1 and 2, the injection molding system 10 of the present invention includes a die generally indicated at 28 including a pair of die halves 30, 32 supported for movement toward each other so as to mate along opposed cooperating joining surfaces 34, 36 to form a mold parting line generally indicated at 38 (see FIG. 2). The die halves 30, 32 cooperate to define a mold cavity, generally indicated at 40, in which the molten plastic cools to form a molded part (P). The die halves 30, 32 are also moveable away from each other to open the mold cavity 40 and to eject the finish molded part (P). While the illustrative embodiment of the present invention employs supports 26 between the two die halves 30, 32 those having ordinary skill in the art will appreciate that several alternatives to direct the die halves in proper alignment may be employed. By way of example, one such alternative may include hinged die halves.

With continuing reference to FIGS. 1 and 2, the injection molding system 10 includes a plurality of ejection pins 24 supported in at least one of the halves 30, 32 of the die 28. The ejection pins 24 are operable to move the finished molded part (P) in a direction away from at least one of the die halves 30, 32. One of the die halves 30, 32 further includes ejection pin apertures 42. The ejection pins 24 operatively engage the ejection pin apertures 42 of the die half 32 and contact the joining surface 36 of the opposing die half 30, the finished molded part (P), and the cooled excess material (M).

Referring to FIGS. 1–4a the injection molding system 10 includes a gate generally indicated at 44 removably mounted to at least one of the die halves 30, 32 and a runner, generally indicated at 46, extending between the gate 44 and the source of pressurized molten plastic 12. The molten plastic flows through the runner 46 between the source of pressurized molten plastic 12 and the gate 44 and into the mold cavity 40. The runner 46 is defined by runner grooves 48, 50 within the joining surfaces 34, 36 of each of the die halves 30, 32 which form the runner 46 upon the die halves 30, 32 mating along the joining surfaces 34, 36. In the illustrative embodiment of FIG. 1, the die 28 forms two molded parts (P) simultaneously. Accordingly a dual runner system 46 for cooperation with two gates 44 and two mold cavities 40 is shown. However those having ordinary skill in the art will appreciate that the present invention may be incorporated within dies adapted to form a single molded part or any number of molded parts simultaneously.

Referring to FIGS. 2–4a, the gate 44 further includes a base 52 having mounting ears 54 adapted to be removably secured to one of the die halves 30, 32. In the preferred embodiment illustrated in these figures, the gate 44 is shown mounted to the die half 32. More specifically, the gate 44 includes a body 56 that is fixed to the base 52. The gate body 56 includes a pair of generally opposing surfaces 58, 60. Each of the opposed surfaces 58, 60 extend at a predetermined relief angle relative to the base 52. The predetermined relief angle facilitates movement between die halves 30, 32 and ensures proper mating along the joining surfaces, 34, 36. However, those having ordinary skill in the art will appreciate that while the illustrative embodiment of the present invention includes opposed surfaces extending at a predetermined relief angle relative to the base, alternative embodiments may include opposed surfaces extending at a right angle relative to the base.

As illustrated in FIGS. 1 and 2, the die half 32 has a gate mounting recess 62 that receives the gate 44 in such a manner that the uppermost surface of the base 52 is flush with the joining surface 34 of the die half 32 (see FIGS. 1 and 2). On the other hand, the die half 30 includes a gate cavity 64 operatively engaged by the body 56 of the gate 44 when the die halves 30, 32 mate along the mold parting line 38. In this case, the lowermost surface of the gate body 56 is flush with the joining surfaces 34, 36 of the die halves 30, 32.

The gate 44 is removably secured to one of the die halves 32 using at least one securing member 66. As illustrated in FIG. 2, the securing member 66 is a screw. The mounting ears 54 include apertures 68 and recesses 70 that accommodate the screw 66 to provide flush mounting against the joining surface 34. However, those having ordinary skill in the art will appreciate that many varying types of securing members may be employed. Moreover, alternative securing members that require neither apertures nor recesses to provide a flush mount of the gate 44 against the joining surface 34 may also be employed. By way of example, the gate 44 may be welded to a die 28 or only one screw-type securing member may be employed. No matter what type of securing member is employed to removably mount the gate 44 to the die 28, those having ordinary skill in the art will appreciate that the number of mounting ears 54 may correspond to the number of securing members 66.

A body 56 and the base 52 cooperate to define an inlet 72 and an outlet 74. A gate flow passage 76 extends between the inlet 72 and the outlet 74. The inlet 72 is defined in the surface 58 so as to be in fluid communication with the runner 46 and the outlet 74 is defined in the surface 60 so as to be in fluid communication with the mold cavity 40. In the preferred embodiment illustrated in these figures, the gate flow passage 76 tapers inwardly from the inlet 72 to the outlet 74. The outlet 74 defines at least one edge surface 78 extending in a direction generally opposite to the movement of the molded part (P) upon ejection from the mold cavity 40. The edge surface 78 of the outlet 74 forms an acute angle with respect to the axis of the flow passage 76 and defines a shearing edge point 78a relative to the gate flow passage 76. The outlet 74 is operable to separate the finished molded part (P) from cooled excess material (M) formed at the gate 44. The ejection pins 24 are further operable to remove excess cooled material (M) from the gate 44 and the runner 46 upon separation of the die halves 30, 32 as will be explained in greater detail below.

As best shown in FIG. 2, the inner diameter of the inlet 72 is substantially the same diameter as the inner diameter of the runner 46. However the inner diameter of the outlet 74 may vary in size. Accordingly, those having ordinary skill in the art will appreciate that there may exist gates 44 in accordance with the present invention 10 having outlets of differing sizes. More particularly, the gates 44 may include outlets having different sizes in standardized increments. In this way, a single die 28 may employ a gate 44 having any one of the standardized sizes, if desired.

Further referring to FIG. 2, after the molten plastic cools to form a finished molded part P, the die halves 30, 32 separate along their joining surfaces 36, 34. Ejection pins 24 engage the finished molded part P to separate the part from the mold cavity 40. Additionally, the ejection pins 24 engage to cooled excess material M to remove it from the gate flow passage 76, runner 46, and sprue 20. The ejection pins may engage the finished molded part P and cooled excess material M simultaneously or in a staged manner.

The present invention facilitates an interchangeable system of molds and in-mold degating inserts by employing a removable gate 44 having a sheering edge point 78a operable to separate the finished molded part (P) from cooled excess material (M) formed at the gate 44. Accordingly, the present invention provides a degating device that not only may be installed within several different molds, but also provides a cost-effective means of replacing the degating insert by eliminating the need to replace the entire mold. Further, the present invention 10 employs use of a removable gate 44 having a sheering edge point 78a along an outlet 74 where the outlet diameter may vary between removable gates 44. This structure facilitates use of degating devices having differing outlet diameters within a single die 28 to provide varying molten plastic flow rates into a mold.

Further, the present invention employs use of a removable gate 44 having a shearing edge point 78a, operable to separate a finished molded part (P) from flash (M). This structure removes flash in a cost-effective manner by reducing the need for secondary degating machines.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A removable degating insert adapted from use within an injection molding system in communication with a source of pressurized molten plastic to form molded plastic parts having a pair of die halves cooperating to define a mold cavity and a runner to direct molten plastic from the source to the mold cavity, said removable degating insert comprising:

a base including mounting ears adapted to facilitate removable attachment to a die half of a mold system where wherein the uppermost surface of the base is flush with the surface of the die half to which said base is removably attached;

a body fixed to said base including a pair of opposed surfaces that define predetermined relief angles relative to said base and a gate flow passage extending therethrough, said gate flow passage including an inlet defined within one of said opposed surfaces and adapted to receive molten plastic from a runner of a mold system and an outlet defined within the other of said opposed surfaces adapted to distribute molten plastic to a mold cavity of a mold system, said outlet including an edge surface extending in a direction generally opposite that of a molded part upon ejection from a mold cavity, wherein said gate flow passage tapers inwardly from said inlet to said outlet and said edge surface forms an acute angle relative to said gate flow passage to define a shearing edge point adapted to separate the finished molded part within a mold cavity from the cooled excess material within said gate flow passage.

2. A removable degating insert for a mold system as set forth in claim 1 wherein each of said mounting ears include an aperture to receive a securing member for removable attachment to a mold half of a mold system.

3. A removable degating insert for a mold system as set forth in claim 2 wherein each of said mounting ears include a recess surrounding said aperture to facilitate flush mounting of said base to the surface of a mold half of a mold system.

4. A removable degating insert for a mold system as set forth in claim 2 wherein said securing member is a screw.

5. A removable degating insert for a mold system as set forth in claim 1 wherein the inner diameter of said inlet is substantially the same diameter as the inner diameter of a runner of a mold system.

* * * * *